United States Patent [19]

Proulx

[11] Patent Number: 5,147,542
[45] Date of Patent: Sep. 15, 1992

[54] MANIFOLD AND MANIFOLD SEGMENT FOR TANGENTIAL FLOW FILTRATION APPARATUS

[75] Inventor: Andrew Proulx, Westford, Mass.

[73] Assignee: Millipore Corporation, Bedford, Mass.

[21] Appl. No.: 650,251

[22] Filed: Feb. 4, 1991

[51] Int. Cl.[5] .............................................. B01D 63/00
[52] U.S. Cl. ........................... 210/321.75; 210/321.84; 210/346; 210/433.1; 210/456
[58] Field of Search .............. 210/346, 321.84, 321.75, 210/321.64, 321.72, 331, 651, 456, 486, 433.1

[56] References Cited

U.S. PATENT DOCUMENTS

| | | | |
|---|---|---|---|
| 4,212,742 | 7/1980 | Solomom et al. | 210/321.84 |
| 4,261,834 | 4/1981 | deWinter | 210/321.69 |
| 4,310,416 | 1/1982 | Tanaka et al. | 210/321.75 |
| 4,715,955 | 12/1987 | Friedman | 210/321.72 |
| 4,849,102 | 7/1989 | Latdur et al. | 210/321.75 |

Primary Examiner—Robert A. Dawson
Assistant Examiner—Ana M. Fortuna
Attorney, Agent, or Firm—Paul J. Cook; Andrew T. Karnakis

[57] ABSTRACT

A tangential flow filtration apparatus which utilizes a single manifold formed of manifold segment or manifold segments to introduce liquid to be filtered into the apparatus and to remove a filtrate stream and a retentate stream from the apparatus is provided. A plurality of filtration modules are stacked between the manifold and a plate. Holes and sealing means are provided within the filtration modules to effect flow of the filtrate, retentate and incoming liquid through the stack and manifold while preventing admixture of the filtrate with the retentate or the incoming liquid. All manifold segments with the exception the most downstream manifold segment or most upstream manifold segment from the point of introducing incoming liquid must have a filtrate to exit from both ends of the manifold segment. The most downstream or the most upstream manifold segment also can have filtrate exits from both of its ends.

11 Claims, 7 Drawing Sheets

MANIFOLD AND MANIFOLD SEGMENT FOR TANGENTIAL FLOW FILTRATION APPARATUS

BACKGROUND OF THE INVENTION

This invention relates to a manifold for a plurality of liquid filtration segments wherein filtration is effected by tangential flow of the liquid across a filter surface. More particularly, this invention relates to a manifold which permits stacking of a plurality of filtration segments wherein liquid is introduced and removed from the filtration module while eliminating the need for conduits for connecting the filtration segments.

Prior to the present invention, liquids, primarily aqueous liquids have been filtered by tangential flow segments wherein a plurality of filters are stacked between two manifolds, one at the bottom of the stack and one at the top of the stack. The filtration module stack comprises a collection of one or more filtration modules and associated intermodule gaskets. The filters are separated by appropriate screens and liquid impervious layers to permit liquid flow, as well as filtrate and retentate flow into and from the stack. In addition, flow holes are provided through the layers within the stack. The holes are sealed appropriately to prevent admixture of filtrate with incoming liquid or retentate. The manifold s in each segment are designed so that filtrate is removed from both the top and bottom manifolds while incoming liquid is introduced into one manifold and retentate is removed from the second manifold. This manifold arrangement necessitates fittings to both manifold s in order to supply and remove liquid to and from the stacks. This is undesirable since additional manipulative steps for removing and connecting the fittings are required when it is desirable to replace the filtration elements forming the stack. In addition, the use of two manifolds to remove filtrate from the stack undesirably increases the filtrate volume retained within the stack. Furthermore, the requirement of two manifolds is undesirably expensive.

It has been proposed in U.S. Pat. No. 4,849,102 to provide a manifold for a plurality of filtration segments. However, this manifold arrangement is limited since only two filtration segments can be accommodated while avoiding the need for conduits external the manifold. That is, when more than two filtration segments are utilized, external connecting conduits are required.

Accordingly, it would be desirable to provide a manifold or a plurality of tangential flow filtration segments which utilizes only one manifold and which accommodates any number of a plurality of filtration segments without the need for conduits external of the manifold. Such an arrangement would greatly reduce the number of sealed fittings and would reduce the required apparatus volume for processing a given volume of liquid.

SUMMARY OF THE INVENTION

In accordance with this invention, a manifold apparatus is provided which can be in fluid communication with any number of a plurality of filtration segments without the need for conduits external of the manifold. The manifold apparatus is comprised of one or a plurality of manifold segments which interconnect with one another to form a stack of manifold segments. A manifold segment comprises a single piece which holds filtration modules on each side and has internal conduits for the feed, filtrate and retentate. All manifold segments with the exception of the most downstream or most upstream manifold segment from the point of introducing incoming liquid must have a filtrate exit from both ends of the manifold segment. The most downstream or the most upstream manifold segment also can have filtrate exits from both of its ends. The retentate exit and incoming liquid inlet can be at the same ends of the manifold segments. The filtrate from filtration segments connected to the manifold is collected from all filtrate exits from the stack and the feed fluid is in fluid communication with retentate within the stack. The filtration segments are secured to the manifold in a manner so that filtrate is separated and collected without admixing with the feed or the retentate.

DESCRIPTION OF SPECIFIC SEGMENTS

Figure 1:
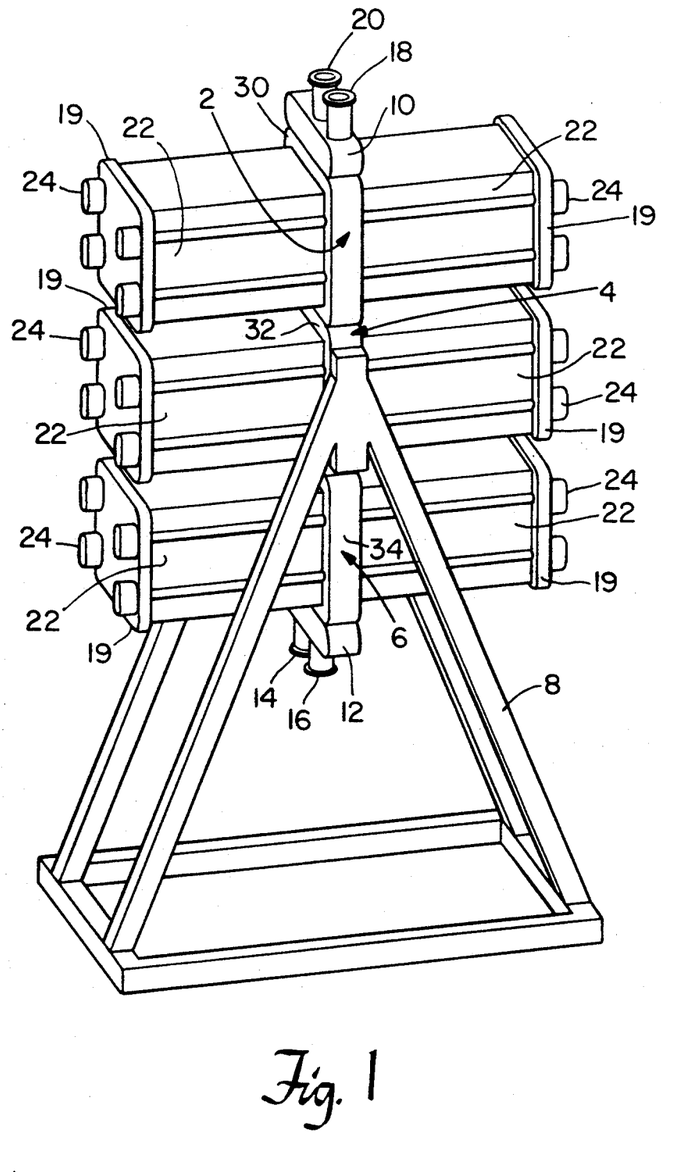
FIG. 1 is an isometric view of the manifold apparatus of this invention in use.

Referring to FIG. 1, the manifold apparatus of this invention includes one or a plurality of center manifold segments 2, 4 and 6 connected together and which can be secured to manifold frame 8. Each end of the stack of manifold segments 2, 4 and 6 is provided with a fitting block 10 or 12 to provide suitable inlets and outlets to the manifold apparatus. A fluid feed inlet 14 and a filtrate outlet 16 are provided on fitting block 12, each of which are in fluid communication with suitable fluid storage means (not shown). A retentate outlet 18 and a filtrate outlet 20 are provided on fitting block 10, each of which are in fluid communication with a suitable fluid storage means (not shown). A plurality of filtration modules 22 are secured to manifold segments 2, 4 and 6 by means of a plate 19 and a plurality of compression assemblies 24 such as bolts. The manifold apparatus is provided with mainfold plate 30, 32 and 34.

Figure 2:
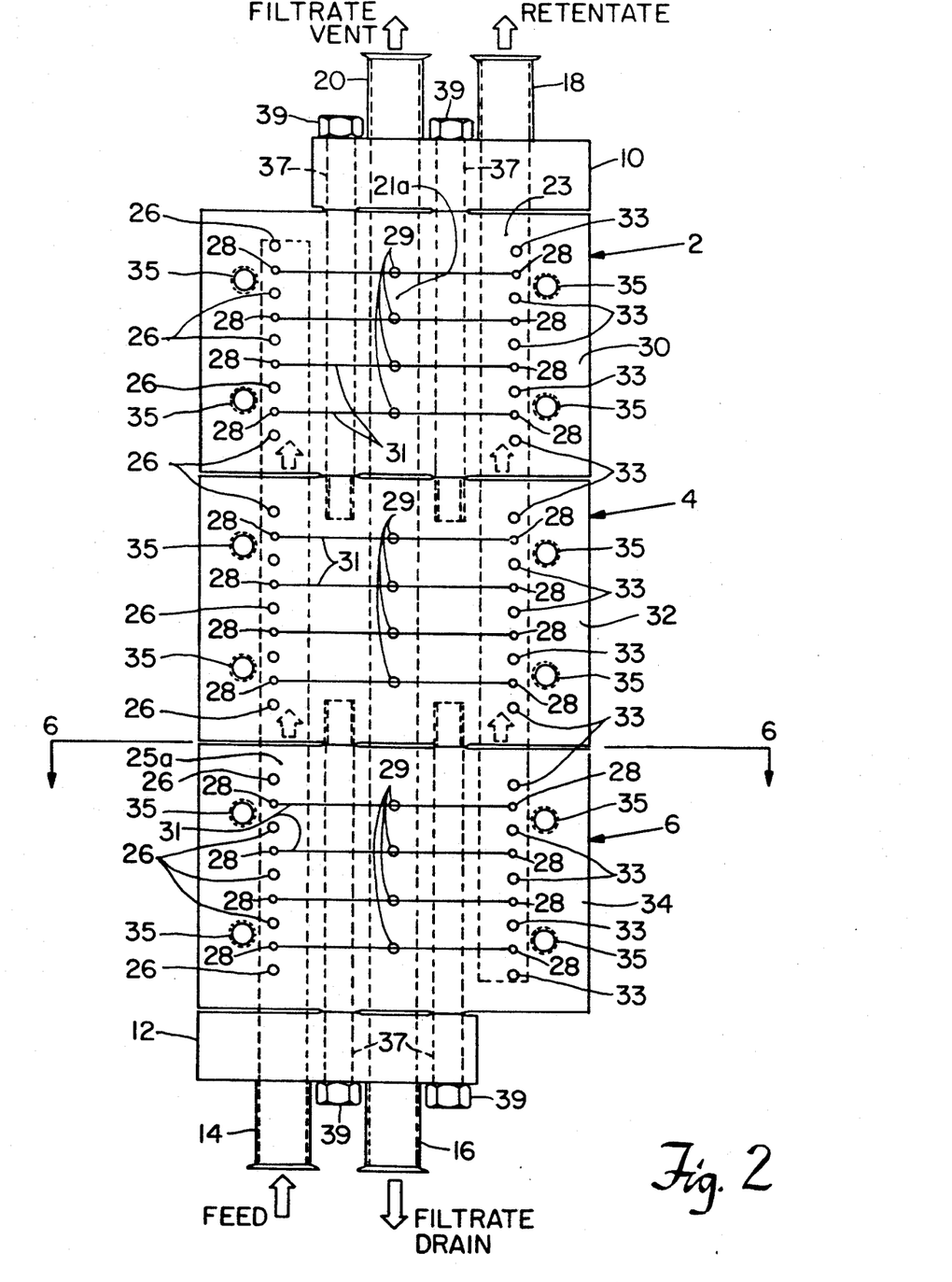
FIG. 2 is a side view of a manifold apparatus of this invention suitable for parallel feed to the manifold segments.
Figure 6:
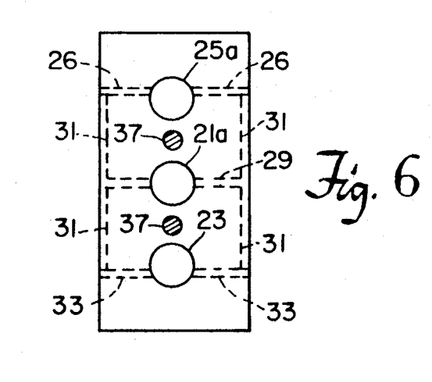
FIG. 6 is a cross sectional view of the apparatus of FIG. 2 taken along line 6—6.

Referring to FIGS 2, and 6, the gaps between fitting blocks 10 and 12 and manifold segments 2, 4 and 6 are provided with conventional gasket means to effect desired sealing of filtrate from retentate and feed. A parallel feed and retentate arrangement is shown in FIG. 2. Fluid feed is introduced through inlet 14, feed channel 25a and into filtration modules 22 (FIG. 1) through fluid feed inlet means 26. Filtrate is removed from filtration modules 22 through filtrate outlet means 28 positioned on opposite sides of manifold segment 2, 4 and 6, filtrate outlet means 29, filtrate channel 21a and filtrate outlets 16 and 20. Outlet means 28 do not extend through manifold plates 30, 32 and 34 while outlet means 29 extend through manifold plates 30, 32 and 34 to fluid communication with filtrate outlets 16 and 20. Filtrate is removed from the manifold through filtrate outlets 16 and 20. The filtrate outlet means 28 and 29 are connected by slots 31 in manifold plates 30, 32 and 34. Retentate is removed from the filtration modules 22 through retentate outlet means 33 comprising holes in plates 30, 32 and 34, retentate channel 23 and retentate outlet 18. Holes 35 are provided in the manifold segments 2, 4 and 6 for bolts or tie rods to secure the filtration modules 22 to the manifold segments 2, 4 and 6. Tie rods 37 and nuts 39 are utilized to secure the manifold segments 2, 4 and 6 together.

Figure 3:
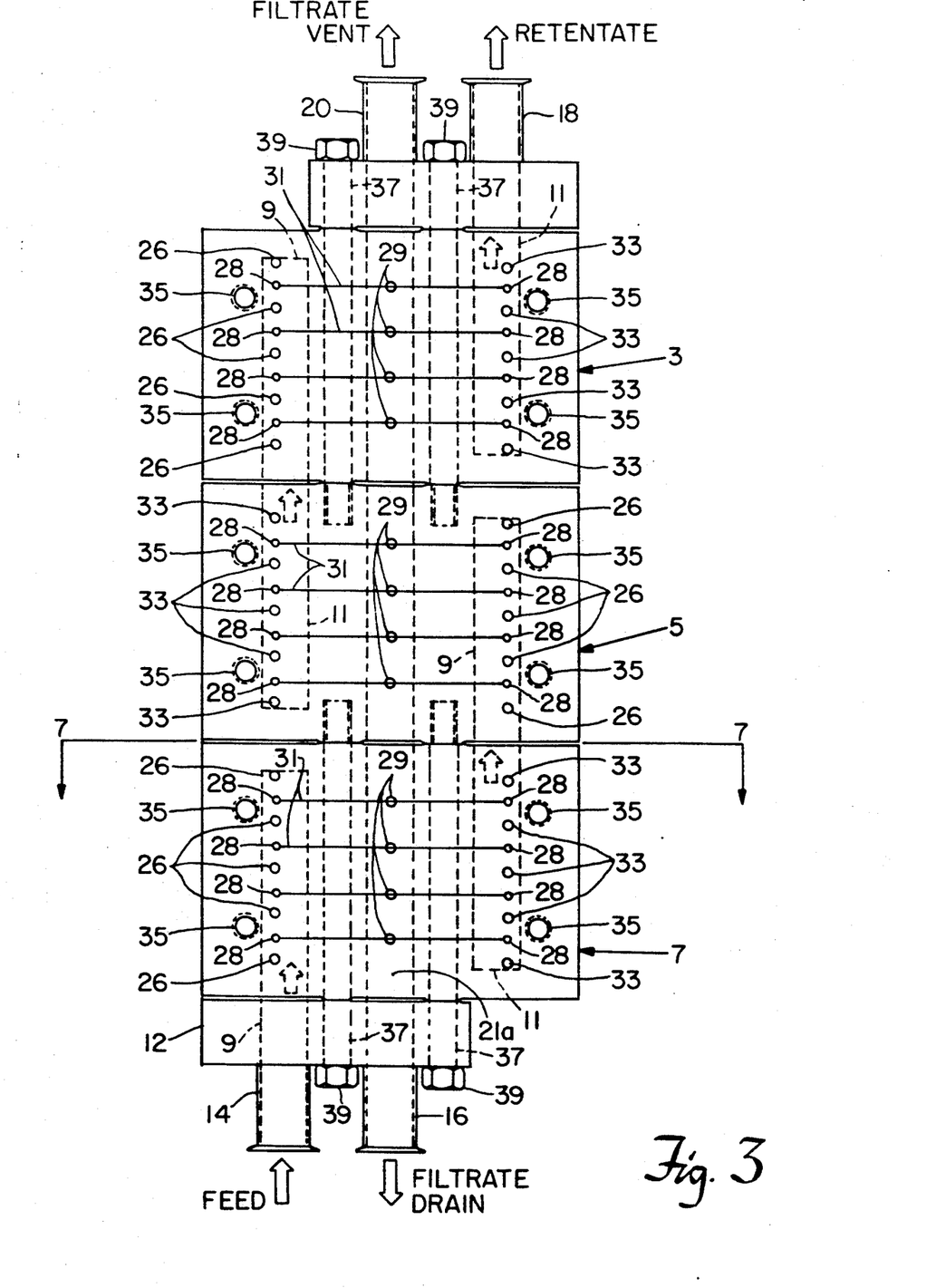
FIG. 3 is a side view of a manifold apparatus of this invention suitable for serial feed to the manifold segments.
Figure 7:
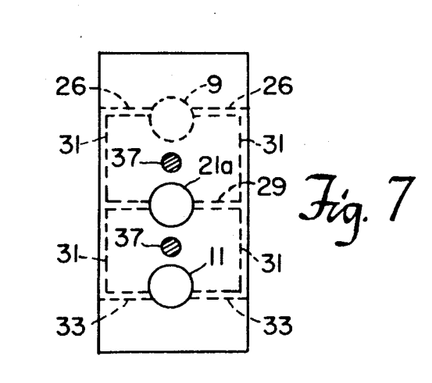
FIG. 7 is a cross sectional view of the apparatus of FIG. 3 taken along line 7—7.

Referring to FIGS. 3 and 7, where like elements to those of FIG. 1 and 2 are numbered the same, manifold segments 3, 5 and 7 are similar to the manifold segments 2, 4 and 6 of FIG. 2 except that only the feed passages 9 and retentate passages 11 pas only through a portion of the thickness of manifold segments 3, 5 and 7 thereby to effect a serial flow through the manifold segment rather than parallel flow.

Figure 4:
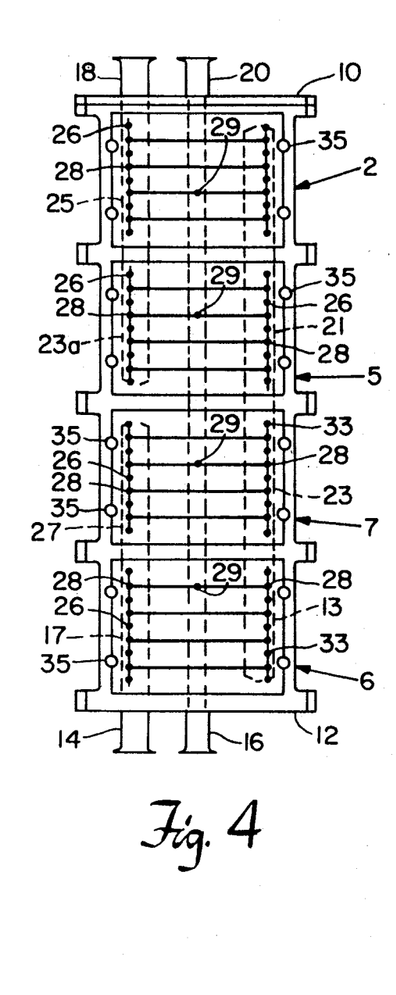
FIG. 4 is a side view of a manifold apparatus of this invention which combines both serial and parallel feed to the manifold segments.
Figure 5:
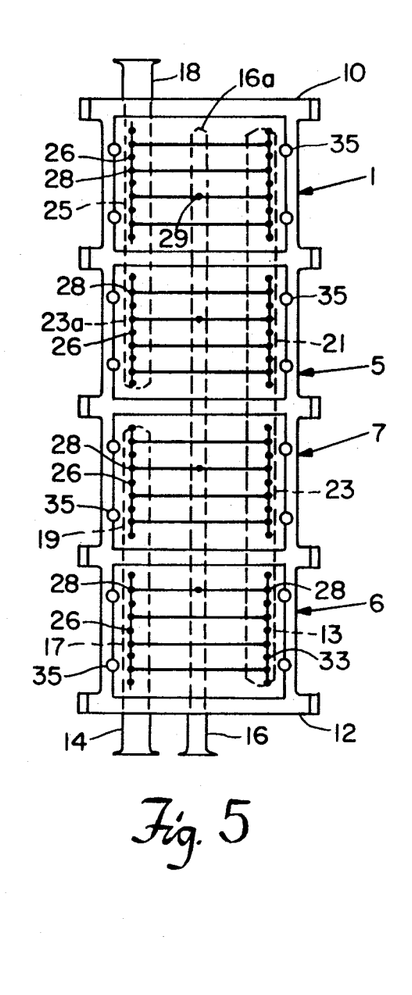
FIG. 5 is a side view of a manifold apparatus of this invention which combines both serial and parallel feed to the manifold segments and which includes a manifold segment having one filtrate exit.

Referring to FIGS. 4 and 5 wherein like elements shown in FIGS. 2 and 3 are represented by the same numeral reference as shown in FIGS. 4 and 6, the manifold apparatus utilizes manifold segments to effect both parallel and serial flow of feed through the manifold apparatus. Manifold segments 6, 7, 5 and 2 are provide in FIG. 4. Feed enters manifold segment 6 and an attached filtration module (not shown) through liquid inlet 14 and fluid inlet means 26. Filtrate is removed from manifold segment 6 through filtrate outlet means 29 and filtrate outlets 16 and 20. Retentate passes from manifold segment 6 through conduit 13 and into manifold segment 7 through conduit 23. Feed passes from manifold segment 6 from conduit 17 into manifold segment 7 through conduit 27. Feed passes from conduit 27 through feed inlet means 26 into a filtrate module (not shown). Filtrate is removed from manifold segment 7 through filtrate outlet means 29 and filtrate outlets 16 and 20. Retentate is removed from manifold segment 7 through retentate channel 23 and into feed channel 21 of manifold segment 5. Thus, feed and retentate pass in parallel flow through manifold segments 6 and 7. Retentate from manifold segment 7 becomes feed in segments 5 and 2 so that the feed in segments 5 and 2 is removed as retentate through conduits 23a and 25 and retentate outlet 18. Filtrate is removed through filtrate outlet means 29 and filtrate outlets 16 and 20. Thus the feed between manifold segments 7 and 5 become series flow and the feed between manifold segments 5 and 2 becomes parallel flow.

The arrangement shown in FIG. 5 is the same as that shown in FIG. 4 except that there is only one filtrate outlet 16 rather than two filtrate outlets 16 and 20. End 16a outlet 16 is capped within manifold segment 1. The flow paths of feed and a retentate is the same as that described above for FIG. 4. Only one filtrate outlet 16 can be utilized in segment 1 so long as two filtrate outlet means are utilized in segments 5, 6 and 7. In the same manner, only one filtrate outlet can be utilized in the arrangements shown in FIGS. 2 and 3.

Figure 8:
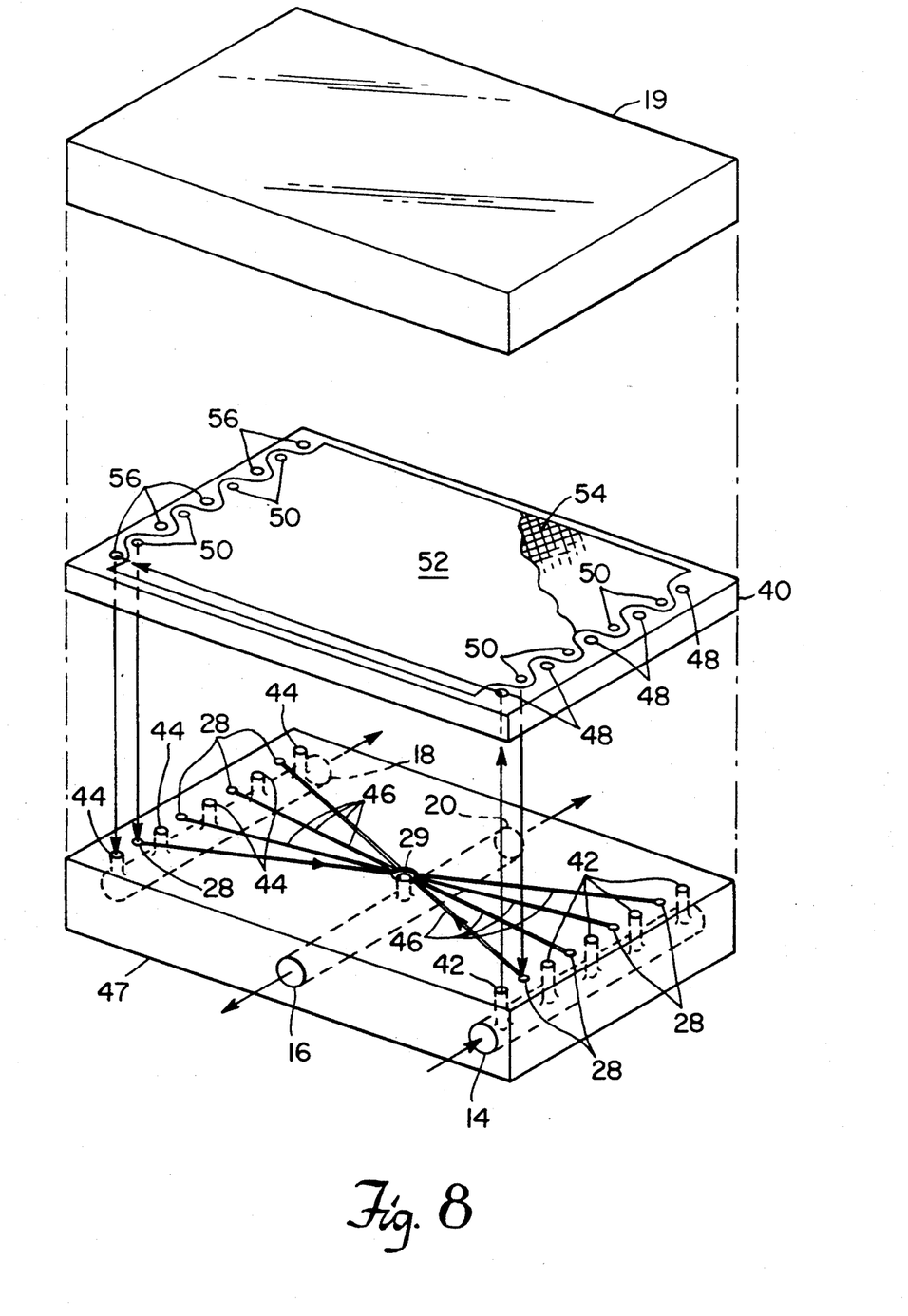
FIG. 8 is an exploded view of a filtration module suitable for use with this invention.

Referring to FIG. 8, a filtration module useful with the manifold of this invention is described. A filtration element 40 is positioned between manifold 47 and plate 19. Manifold 47 is provided with liquid inlet 14, filtrate outlets 16 and 20 and retentate outlet 18. The manifold 47 includes a plurality of feed inlet means 42 and a plurality of retentate outlet means 44. One set of filtrate outlet means 28 is provided on one end of the manifold 7 while a second set of filtrate outlet means 28 is provided on the opposite end of manifold 47. The filtrate outlet means 28 are connected to filtrate outlets 16 and 20 by filtrate conduit paths 46 and centrally located means 29. The paths 46 are of a size which permits filtrate to flow therethrough while avoiding sagging of a filtrate screen (not shown) into the paths 46 typically about 0.6 to 0.12 inch wide. The filtration element 40 includes holes 48 which communicate with liquid inlet means 42 and holes 50 which communicate with filtrate outlet means 28. As seen in FIG. 8, the filtrate side 52 of the filtration element 40 having mesh spacer 54 in contact therewith is exposed. The filtration segment 40 is also provided with holes 56 which communicate with retentate outlet means 44. The plate 19 serves as a seal for the top surface of the filtration element 40.

Figure 9:
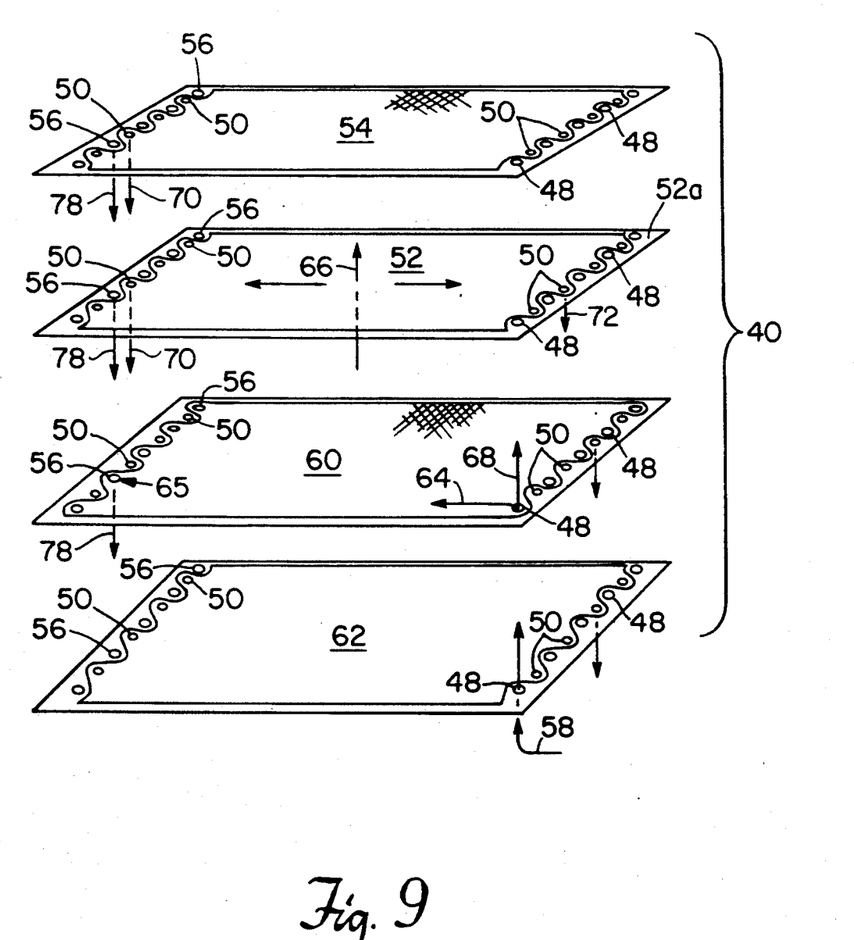
FIG. 9 illustrates the function of a filtration module uitable for use with this invention.

Referring to FIG. 9, the filtration element 40 includes a filtrate spacer 54, a filter layer 52a, a retentate spacer 60 and a filter layer 62 with a second filtrate spacer (not shown) and which can contact conduit paths 46. The liquid feed represented by arrow 58 passes through holes 48 in layer 62 into spacer 60. A portion of the liquid passes through spacer 60, as represented by arrow 64 and through filter 52 as represented by arrow 66. The remaining portion of the incoming liquid passes upwardly as represented by arrow 68, through holes 48 in filter layer 52a, holes 48 in filtrate spacer 54 and into the next adjacent filtration member (not shown) wherein it proceeds as described above with reference to filtration element 40. The filtrate passes into holes 50 and passes in a direction as shown by arrows 70 and 72 toward filtrate outlet means 28 (FIG. 8). The retentate passes across retentate spacer 60 as shown by arrows 64 and 65, through holes 56 and to retentate outlet means 44 (FIG. 8) in a direction as shown by arrow 78. The filtrate passes into holes 28, grooves 46, outlet means 29 (FIG. 8) toward filtrate outlets 16 and 20. The retentate passes through holes 44 and to rententate outlet 18.

Figure 10:
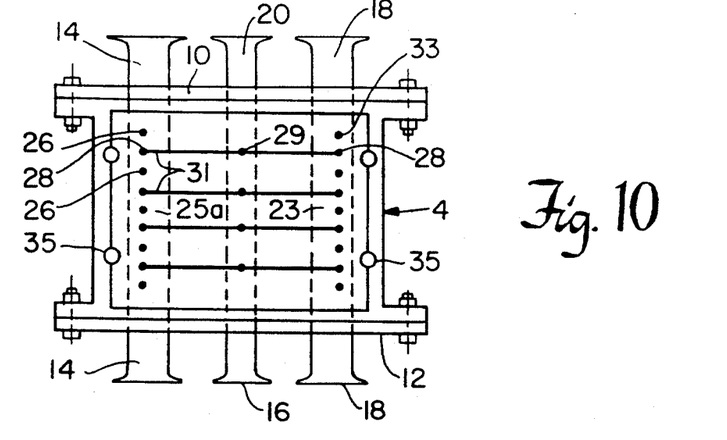
FIG. 10 is a side view of a manifold segment useful alone as a manifold of this invention.

Referring to FIG. 10, feed fluid is introduced into manifold segment 4 through feed inlets 14 and retentate removed from retentate outlets 18. Filtrate is removed from filtrate outlets 16 and 20. Feed enters filtration modules (not shown) through feed inlet means 26 from feed channel 25a and retentate is removed through retentate outlet means 33, retentate channel 23 and retentate outlet 18.

Figure 11:
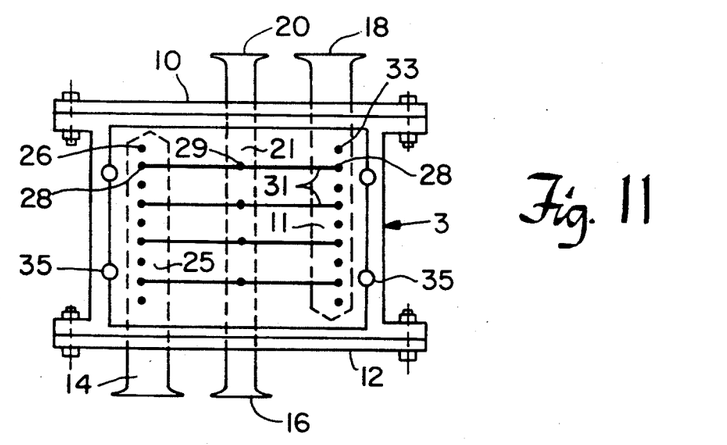
FIG. 11 is a side view of an alternative manifold segment useful alone as a manifold of this invention.

Referring to FIG. 11, feed fluid is introduced into manifold segment 3 through feed inlet 14 and retentate is removed from retentate outlet 18. Filtrate is removed from filtrate outlets 16 and 20 through feed inlet means 26 from feed channel 25 and retentate is removed from retentate outlet means 33, retentate channel 11 and rententate outlet 18.

Figure 12:
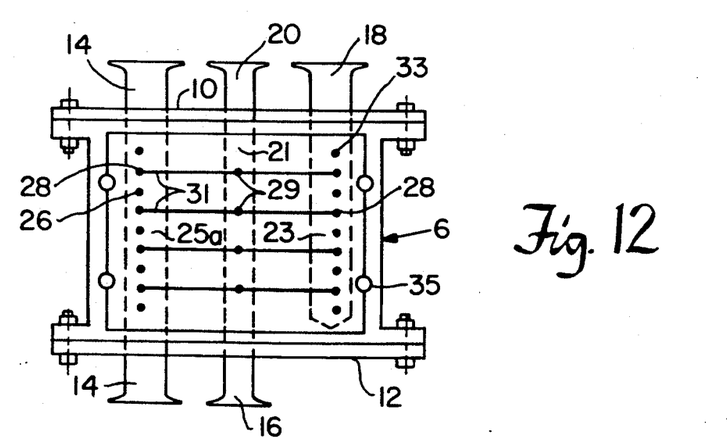
FIG. 12 is a side view f an alternative manifold segment useful alone as a manifold of this invention.

Referring to FIG. 12, feed fluid is introduced into manifold segment 6 through feed inlets 14 and retentate is removed from retentate outlet 18. Filtrate is removed from filtrate outlets 16 and 20. Feed enters filtration modules (not shown) through feed inlet means 26 from channel 25a and retentate is removed through retentate outlet means 33, retentate channel 23 and retentate outlet 18.

The manifold segments shown in FIG. 10, 11 and 12 can be utilized as a manifold or with other manifold segments without the need for conduits connecting the manifold segments which conduits are external of the manifold segments.

I claim:

1. A manifold apparatus which comprises a plurality of manifold segments adapted to be connected to each other, each of said manifold segments having a first surface, a second surface, a third surface and a fourth surface, said first surface having a fluid feed inlet and a first filtrate outlet, said second surface having a retentate outlet and a second filtrate outlet, said third and fourth surfaces spaced apart from each other and positioned between said first surface and said second surface and having fluid feed inlet means in fluid communication with (a) said fluid feed inlet and (b) a filtration module, a retentate outlet means in fluid communication with (a) said retentate outlet and (b) a filtration module and a filtrate outlet means in fluid communication with (a) a filtration module, (b) said first filtrate outlet and (c) said second filtrate outlet, a plurality of said filtration modules adapted to separate a feed fluid into a retentate fluid and a filtrate fluid each secured to said third and fourth surfaces of each of said manifolds segments, said manifold segments being connected at a first surface of a first manifold segment to a second surface of an adjacent second manifold segment to effect fluid communication of retentate channels, filtrate channels and feed channels in connected manifold segments.

2. A manifold apparatus which comprises a plurality of manifold segments adapted to be connected to each other to form a stack of manifold segments having a first end manifold segment and a second end manifold segment, said first end manifold segment having a first surface with a feed inlet and a first filtrate outlet, a second surface having a retentate outlet and a second filtrate outlet, and third and fourth surfaces spaced apart from each other and positioned between said first surface and said second surface, said third and fourth surfaces having fluid feed inlet means in fluid communication with (a) said fluid inlet and (b) a filtration module, a retentate outlet means in fluid communication with said (a) retentate outlet and (b) a filtration module and a filtrate outlet means in fluid communication with (a) a filtration module and (b) said first filtrate outlet and (c) said second filtrate outlet, said second end manifold segment having a fifth surface with a feed inlet, and a first filtrate outlet, a sixth surface having a second filtrate outlet and a retentate outlet, and seventh and eighth surfaces spaced apart from each other and positioned between said fifth surface and said sixth surface and having fluid feed inlet means in fluid communication with (a) said fluid inlet and (b) a filtration module, a retentate outlet means in fluid communication with (a) said retentate outlet and (b) a filtration module and a filtrate outlet means in fluid communication with (a) a filtration module, (b) said first filtrate outlet and (c) said second filtrate outlet, a plurality of said filtration modules adapted to separate a feed fluid into a retentate fluid and a filtrate fluid each secured to said third, fourth, seventh and eighth surfaces, said manifold segments being connected at a first surface of a first manifold segment and a sixth surface of a second manifold segment whereby said retentate outlet of said second manifold segment is in fluid communication with the feed inlet of said first manifold segment and the second filtrate outlet of said second manifold segment is in fluid communication with the first filtrate outlet of said first manifold segment.

3. The manifold apparatus of any one of claims 1 or 2 wherein said filtrate outlet means includes a plurality of substantially parallel grooves in fluid communications with said first and second filtrate outlets.

4. The manifold apparatus of any one of claims 1 or 2 wherein said filtrate outlet means includes a plurality of converging grooves in fluid communication with said first and second filtrate outlets.

5. The manifold apparatus of claim 2 having an end manifold segment having a single outlet comprising a retentate outlet at an end of a plurality of manifold segments of said manifold apparatus.

6. The manifold apparatus of claim 2 which includes at least two of said first manifold segments and at least one of said second manifold segments and wherein a first manifold segment connected to a second manifold segment is connected (a) at a first surface of a first manifold segments and at a sixth surface of a second manifold segment or (b) at a second surface of a first manifold segment and at a fifth surface of a second manifold segment.

7. The manifold apparatus of claim 2 which includes at least two of said first manifold segments and at least one of said second manifold segments and wherein a first manifold segment connected to a second manifold connected (a) at a first surface of a first manifold segment and at a sixth surface of a second manifold segments or (b) at a second surface of a first manifold segment and at a fifth surface of a second manifold segment.

8. The manifold apparatus of claim 1 having an end manifold segment having a single outlet comprising a retentate outlet at an end of a plurality of manifold segments of said manifold apparatus.

9. A manifold segment which comprises, a first surface having a feed inlet and a first filtrate outlet, a second surface having a retentate outlet and a second filtrate outlet, and third and fourth surfaces spaced apart from each other and positioned between said first surface and said second surface, said third and fourth surfaces having fluid feed inlet means in fluid communication with (a) said fluid feed inlet and (b) a filtration module, a retentate outlet means in fluid communication with (a) said retentate outlet and (b) a filtration module and a filtrate outlet means in communication with (a) a filtration module, (b) said first filtrate outlet and (c) said second filtrate outlet.

10. A manifold segment which comprises, a first surface having a feed inlet, a first filtrate outlet and a retentate outlet, a second surface having a retentate outlet, a second filtrate outlet and a feed outlet and third and fourth surfaces spaced apart from each other and positioned between said first surface and said second surface, said third and fourth surfaces having fluid feed inlet means in fluid communication with (a) said fluid inlet and (b) a filtration module, a retentate outlet means in fluid communication with (a) said retentate outlet and (b) a filtration module and a filtrate outlet means in fluid communication with (a) a filtration module, (b) said first filtrate outlet and (c) said second filtrate outlet.

11. The manifold segment of claim 9 wherein said second surface includes a feed outlet.

* * * * *